Figure 1:
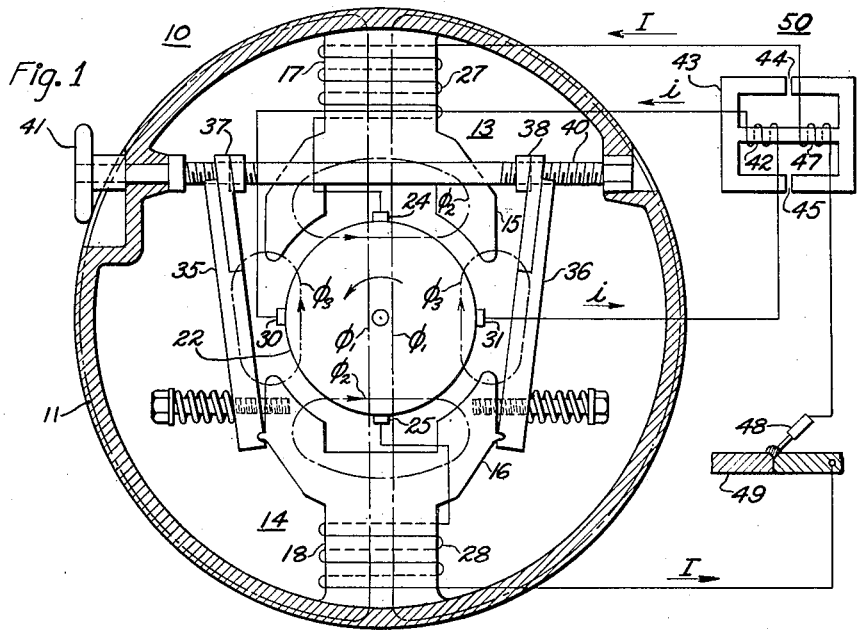

Nov. 7, 1939.  M. S. HANCOCK  2,179,331

WELDING SYSTEM

Filed Oct. 2, 1937

WITNESSES:
E. F. Oberheim
F. Giolma

INVENTOR
Myron S. Hancock
BY
ATTORNEY

Patented Nov. 7, 1939

2,179,331

UNITED STATES PATENT OFFICE 2,179,331

WELDING SYSTEM

Myron Scott Hancock, Wilkinsburg, Pa., assignor to Westinghouse Electric & Manufacturing Company, East Pittsburgh, Pa., a corporation of Pennsylvania.

Application October 2, 1937, Serial No. 166,994

5 Claims. (Cl. 171—312)

My invention relates, generally, to welding systems, and it has reference, in particular, to direct-current arc welding systems utilizing a generator of the cross-field type for supplying the welding current.

It is well known that in electric arc-welding, it is highly desirable to provide a source of welding current that is readily responsive to frequent and sudden alterations in the welding circuit—such fluctuations as may be produced almost continually by the passage of globules of molten weld metal from the electrode to the work, and such as may at times be introduced by changes in the length of the arc, due to the operator's manipulation of the electrode. Dynamo-electric machines of the cross-field type have proved highly suitable in such applications and have been widely adopted by the welding industry, particularly because of their flexibility of operation and their constant-current characteristics, which aid greatly in maintaining a stable welding arc under adverse conditions.

It has been found that marked improvements may be secured in the performance of a dynamo-electric machine of the cross-field type by controlling the different magnetic fluxes set up within the machine. For instance, by the use of magnetic shunt members to provide an adjustable leakage path for the armature reaction flux of a generator of this kind, it is possible to vary the output of the generator over a wide range with little or no reduction of efficiency. Further, by applying damper windings to the aforesaid magnetic shunt members, and thereby controlling sudden changes in the armature reaction flux, the performance of the generator may be greatly stabilized when operating under such fluctuating load conditions as are encountered in manual welding operations.

It has further been found that, by introducing into the cross-magnetizing armature current circuit of a dynamo-electric machine of the cross-field type, a potential proportional to the rate of change of current in the load circuit, and in such a direction as to aid the corresponding change of cross-magnetizing armature current in the armature circuit, under loaded conditions, operation of the generator may be materially improved.

It is, therefore, generally an object of my invention to minimize the amount of variation of the welding current of a dynamo-electric machine of the cross-field type from the normal welding current, upon the occurrence of variations in load circuit conditions during welding.

A more specific object of my invention is to provide for utilizing an inductive coupling device, such for example, as a transformer between the load circuit of a generator of the cross-field type and its cross-magnetizing armature circuit to improve the stability of the generator under varying load conditions.

Another object of my invention is to provide a negative inductive coupling between the load circuit of a dynamo-electric machine of the cross-field type and the cross-magnetizing armature current circuit of said machine so that a variation in load current affects a change in the cross-magnetizing armature current in the opposite sense.

A further object of my invention is to provide for introducing a potential, proportional to the rate of change of load current, into the short-circuited armature circuit of a generator of the cross-field type, in a direction to assist a change of current in that circuit under load conditions.

Another object of my invention is to provide for stabilizing the operating characteristics of a dynamo-electric machine of the cross-field type used in arc-welding systems.

Other objects will in part be obvious, and in part, appear hereinafter.

My invention, accordingly, is disclosed in the embodiment shown in the accompanying drawing, and comprises the features of construction, combination of elements and arrangement of parts, which will be exemplified in the construction hereinafter set forth, and the scope of the application of which will be indicated in the appended claims.

In practicing a preferred form of my invention, in connection with a dynamo-electric machine of the cross-field type, a negative mutual inductive coupling may be provided between the load circuit and the cross-field armature-current circuit of the machine, so that under normal load conditions any increase in the load current effects a corresponding decrease in the cross-field armature current. This may be accomplished by utilizing an unsaturated iron core transformer having an air gap in the core, the primary winding of the transformer being connected with the load circuit of the machine, and the secondary winding connected to the normally short-circuited auxiliary brushes of the cross-field generator. By so relating these windings that, the normal flow of current therethrough is in the same relative sense, any change of current in the load or welding circuit under normal load conditions induces an electromotive force between the auxiliary brushes in such a direction as to assist the natural change of current in the auxiliary brush circuit. By proportioning the windings to secure a negative mutual coupling between the load and auxiliary brush circuits of such a value as to substantially improve the phase relation of the corresponding variations in cross-magnetizing armature current and main armature current by speeding up the corresponding changes of cross-magnetizing armature current, it has been found that a marked decrease in the deviation from normal load or welding current may be secured when operating under varying load conditions, and the stability of the machine thereby greatly improved.

Figure 2:
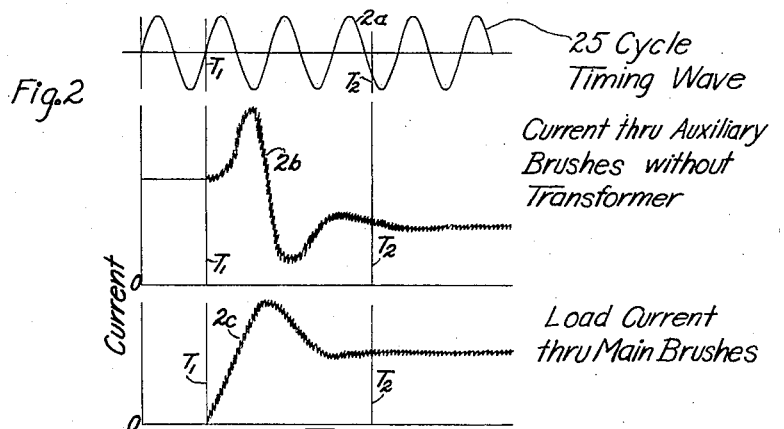
Figure 3:
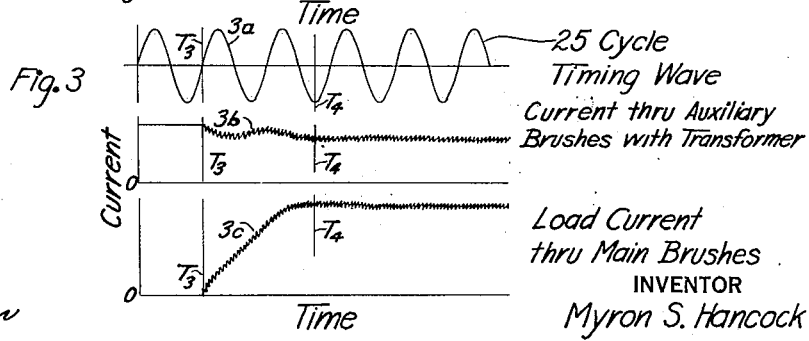

For a more complete understanding of the nature and scope of my invention, reference may be had to the following detailed description, taken in connection with the accompanying drawing, in which:

Figure 1 is a diagrammatic view of a welding system embodying the principal features of my invention; and Figs. 2 and 3 are oscillographic curves of the operating characteristics of a dynamo-electric machine of the cross-field type with and without, respectively, the inductive coupling means between the load circuit and the cross-field armature-magnetizing-current circuit, as practiced in my invention.

Referring particularly to Fig. 1, the reference numeral 10 denotes generally a direct-current generator of the cross-field type such as is described in detail in U. S. Letters Patent No. 2,057,471, issued to J. H. Blankenbuehler, and assigned to the assignee of this application, or as disclosed in the pending application, Serial No. 26,871, of J. H. Blankenbuehler, also assigned to the assignee of this application.

Generally, the dynamo-electric machine 10 may comprise a main frame 11, having oppositely disposed field pole members 13 and 14 positioned therein, said field poles comprising enlarged shoe portions 15 and 16, and narrow neck portions 17 and 18, respectively. An armature 22 may be rotatably disposed between the pole members in any well-known manner, having main brushes 24 and 25 associated therewith and connected to series field windings 27 and 28 of the field pole members 13 and 14, respectively. The machine is provided with auxiliary brushes 30 and 31, which, in the customary use of the machine, are connected in short-circuit relation to provide an external path of low impedance for the cross-field armature-magnetizing current. However, in the present invention these brushes are connected in a different manner, as will be described in detail hereinafter.

To provide for adjustment of the output of the cross-field generator 10, magnetic shunting members 35 and 36 may be utilized. They may be disposed in pivotal relation with the field pole member 14, and operatively connected by means of arms 37 and 38, respectively, with a threaded shaft 40 operatively mounted within frame 11 and having a handwheel 41 disposed thereon, outside of the frame 11. By manipulation of the handwheel 41, the shunt members 35 and 36 may be adjustably positioned with relation to the field pole member 13, thereby varying the reluctance of the path of the armature reaction flux of the armature 22, and hence altering the output of the machine.

Since, for a clear understanding of the functioning of my invention, it is necessary to realize fully the peculiar construction and operaion of the cross-field type of generator, which is included in my present invention, the following brief description may be studied in connection with the dotted magnetic flux paths as shown in Fig. 1.

The cross-field type of generator herein referred to is essentially a two-pole generator having series excitation only. Under no-load conditions, a residual magnetic flux $\phi_1$ exists between the two pole members 13 and 14, which flux, when cut by the conductors of the armature 22, induces a cross-field magnetizing current $i$ therein, which flows between the close-circuited auxiliary brushes 30 and 31. This current $i$ produces a cross-field magnetizing flux $\phi_2$, which flows transversely across the enlarged shoe portion 15 and 16 of the pole members 13 and 14, respectively, and through adjacent portions of the armature 22, where it is cut by the armature conductors, thereby inducing a voltage between the main brushes 24 and 25.

Under load conditions, the load circuit being closed, this voltage between the brushes 24 and 25 causes a load current I to flow through the series field pole windings 27 and 28 and through the load circuit, including the electrode 48 and work 49. The flow of load current I through the series field windings 27 and 28 is in such a direction that it increases the flux $\phi_1$, which in turn increases the induced exciting current $i$, thereby increasing the cross-field flux $\phi_2$, until saturation of the narrow pole neck portions 17 and 18 of the main field pole members 13 and 14, respectively, is reached. Upon the narrow pole neck portions 17 and 18 becoming saturated, $\phi_1$ can no longer increase as rapidly, while $\phi_3$, which is the armature reaction flux induced by flow of current I through the armature 22, is not so limited, having instead, a ready path through the magnetic shunt members 35 and 36. It may, therefore, continue to increase with any further increase of I.

Upon a sudden change in the condition of the load or welding circuit, such as might be produced by a shortening of the length of the arc maintained by the operator, the current I may, therefore, momentarily increase, increasing $\phi_3$, which is opposite in sense to the main flux $\phi_1$. Because of saturation of the pole neck portions 17 and 18, $\phi_1$ cannot so increase. As the cross-field magnetizing current $i$ is induced by the effective difference between the opposed fluxes $\phi_1$ and $\phi_3$, any increase of $\phi_3$, without a similar increase of $\phi_1$, thereby effectively reduces the exciting current $i$. This decreases the cross-field magnetizing flux $\phi_2$, and correspondingly decreases the voltage between the main brushes 24 and 25, so that the flow of load current I is reduced. It may thus be seen that the inherent characteristics of a machine of the cross-field type are such as to tend to maintain automatically an essentially constant current despite variations in the length of the arc, or other fluctuations in the welding circuit.

Despite the natural tendency for a dynamo-electric machine of the cross-field type to maintain an essentially constant current, it has been found that there is some time lag in the response of the cross-field magnetizing current to sudden changes in load current. Under certain welding conditions and particularly when overhead welding is being done, this time lag in the response of the cross-magnetizing current to sudden changes in the welding current is highly objectionable, as dips in the welding current may occur to such a degree as to interrupt the arc. This results in the machine being relatively unstable, and not only produces welds which are porous and of low tensile strength, but causes a splattering of weld metal which must be removed by additional labor.

In order to improve the stability of the machine when operating under varying load conditions, provision is made for utilizing the fluctuations of the load current to produce the necessary changes in the cross-magnetizing armature current of the machine. One way in which to accomplish this is to utilize a suitable transformer 50 for inductively coupling the load circuit to the auxiliary brushes 30 and 31 of the machine, the secondary winding 42 of the transformer being connected across these brushes to provide a closed circuit, as shown.

The coupling transformer 50 may comprise, generally, a core member such as the shell-type laminated magnetic core 43, having means such as the air gaps 44 and 45 in the two outer legs thereof, to prevent saturation of the core. The secondary winding 42, disposed about the central leg of the transformer core, may be connected with the auxiliary brushes 30 and 31, while the primary winding 47, which is likewise disposed about said central leg, may be connected in series circuit relation with the series field windings 27 and 28 of the generator and the load circuit thereof, which comprises an electrode 48, and work 49 upon which a welding operation is to be performed. The windings 42 and 47 are preferably disposed on the core 43 in close coupled relation and wound in such a sense that the normal flow of current in both windings produces a magnetic flux in the same direction.

By inductively coupling the load circuit and the cross-field armature magnetizing circuit through the use of the coupling transformer 50, it may thus be possible to utilize the effect of sudden changes of current in the load circuit to induce a potential in the secondary winding 42 of the coupling transformer 50, and apply it between the auxiliary brushes 31 and 32 of the generator in such a direction as to facilitate the corrective change of the cross-field exciting current $i$ under load conditions. This action aids greatly in restoring balance in the load circuit, and assists in stabilizing the current output of the machine, by providing an electromotive force when a sudden change in load current occurs, and applying it to the cross-magnetizing current circuit in such a direction as to speed up the natural change of the cross-magnetizing current in response to the fluctuation of current in the load or welding circuit. By so speeding up the natural change of cross-magnetizing armature current, any time delay thereof is minimized, and the current change in the cross-magnetizing current is maintained more nearly in its correct phase relation with the corresponding change in the load or welding current. The corrective effect of the cross-magnetizing armature current is therefore more readily effective and dips in the load current are thus greatly minimized, as the inherent corrective functioning of the cross-field type of dynamo-electric machine is greatly speeded up, so that deviations in load current cannot be so marked.

Referring to Fig. 2, curves 2b and 2c, which are typical oscillographic curves of the armature cross-field magnetizing current and the load current, respectively, of a cross-field type of dynamo-electric machine not organized in accordance with my invention, illustrate the operating characteristics of the machine in going from open-circuit to short-circuit conditions, such as might occur when the operator strikes the electrode against the work in striking an arc. It may be seen by reference to these curves, taken in connection with curve 2a, which is a 25-cycle timing curve, that the values of the exciting current and load current increase sharply upon the closing of the load circuit at a time $T_1$, rising to values far in excess of the sustained short circuit values, before the corrective effect of the cross-magnetizing current finally brings the load current to a steady state condition at a time $T_2$.

Referring to Fig. 3, which shows the oscillographic curves of the operating characteristics of a cross-field type dynamo-electric machine embodying my invention, it may be seen from curves 3b and 3c, which are curves of the cross-field magnetizing current and load current, respectively, that the peak values of these currents in going from their open-circuit to short-circuit values, are greatly reduced. By referring these curves to curve 3a, a 25-cycle timing wave, it may further be seen that the corrective effect of the cross-magnetizing armature current is markedly increased and that said current commences to decrease almost as soon as the load circuit is closed, thus reducing appreciably the time required for the currents to reach the sustained short circuit value at $T_4$, when the welding circuit is closed at a time $T_3$, as shown. Further, there is practically no time delay or phase shift in the commencement of the corrective change of the cross-magnetizing current, which decreases almost instantaneously, instead of first rising to a peak, as shown by curve 2b, where my invention is not utilized.

Likewise, when welding, my invention proves highly advantageous in reducing the amount of "dip" in the welding current when a welding operation is being performed, thereby greatly decreasing the possibility of the arc becoming extinguished owing to momentary circuit variations, and greatly facilitating the ease of welding.

It will, therefore, be seen that, by application of my invention including dynamo-electric machines of the cross-field type as used in arc-welding systems, it is possible to greatly stabilize the operation of such machines. This improved performance greatly facilitates the welding operation, as by reducing the peak voltages normally incurred under fluctuating circuit conditions, the spattering of weld metal may be greatly reduced and welding efficiency increased. Interruptions of the arc through variations in arc length and through "dips" of the current below the welding value are also minimized by utilizing a corrective coupling between the load circuit and the close-circuited auxiliary brush circuit, and the burning of deposited weld metal may be materially reduced, thus permitting cleaner and stronger welds to be made.

Since different embodiments of the invention may be made without departing from the spirit and scope of my invention, it is intended that all the matter disclosed herein or shown in the accompanying drawing shall be considered as illustrative, and not in a limiting sense.

I claim as my invention:

1. The combination in a welding system of a generator of the cross-field type having an armature, a pair of main brushes associated with the armature, field windings connected in series circuit relation with the main brushes, a load circuit connected with the main brushes and field windings, a pair of auxiliary brushes associated with the armature in quadrature relation to the main brushes, to provide a closed armature cross-field excitation circuit, and transformer means connected between the load circuit and the auxiliary brush armature circuit to accelerate the rate of change of current in the auxiliary brush armature circuit upon a variation of current in the load circuit.

2. The combination with a generator of the cross-field type having an armature, a pair of main brushes associated with the armature, field windings connected in series circuit relation with the main brushes, auxiliary brushes associated with the armature having an axis substantially normal to the axis of the main brushes, circuit means connecting the auxiliary brushes to provide an external path of low impedance to provide an internal armature circuit for producing a cross-field excitation flux, and a load circuit connected with the main brushes and the field windings, of inductive coupling means connecting the said circuit means and the load circuit to effect changes in the current in the internal armature circuit in the opposite sense to changes of load current in the load circuit.

3. In a generator of the cross-field type having field poles provided with series field windings, an armature having main and auxiliary brushes associated therewith, the combination of a load circuit connected with the main brushes and series field windings, circuit means connecting the auxiliary brushes to provide a closed armature path for providing a cross-field flux, and inductive coupling means having associated windings so connected to the load circuit and the said circuit means as to assist the normal changes of current in the closed armature path in response to changes of current in the load circuit under load condition.

4. In a welding system, the combination with a generator of the cross-field type having a pair of field pole members with series field windings, an armature having main and auxiliary brushes, a load circuit connected in series circuit relation with the main brushes and the series field windings, and circuit means connecting the auxiliary brushes to provide an armature circuit for producing a cross-field flux, of inductive coupling means having windings so connected in the load circuit and the auxiliary brush circuit of the armature as to increase the normal rate of change of current in the auxiliary brush circuit in response to a change of current in the load circuit.

5. The combination with a generator of the cross-field type having field pole members with field windings, an armature with main and auxiliary brushes, a load circuit connected in series circuit relation with the field windings and main brushes, of an unsaturated transformer having a winding connecting the auxiliary brushes to provide an external connection for an internal armature circuit which produces a cross-field flux, and an associated winding so connected in the load circuit as to accelerate the natural changes of the cross-field magnetizing current in the internal auxiliary brush circuit of the armature in the opposite sense to changes of current in the load circuit.

MYRON SCOTT HANCOCK.